(12) United States Patent
DeHoff et al.

(10) Patent No.: US 6,560,104 B2
(45) Date of Patent: May 6, 2003

(54) PORTABLE COMPUTER AND DOCKING STATION COOLING

(75) Inventors: Robert E. DeHoff, Mount Joy, PA (US); Kevin A. Grubb, Niantic, CT (US)

(73) Assignee: Thermal Corp., Stanton, DE (US)

( * ) Notice: Subject to any disclaimer, the term of this patent is extended or adjusted under 35 U.S.C. 154(b) by 45 days.

(21) Appl. No.: 09/817,921

(22) Filed: Mar. 27, 2001

(65) Prior Publication Data

US 2002/0145852 A1 Oct. 10, 2002

(51) Int. Cl.[7] .................................................. G06F 1/20
(52) U.S. Cl. ....................... 361/687; 361/699; 361/700; 165/104.33; 165/185; 174/15.2
(58) Field of Search ................................ 361/687, 699, 361/700; 165/104.14, 104.33, 185; 62/259.2; 174/15.2

(56) References Cited

U.S. PATENT DOCUMENTS

| | | | | |
|---|---|---|---|---|
| 5,704,212 A | | 1/1998 | Erler et al. ..................... 62/3.2 |
| 5,757,615 A | | 5/1998 | Donahoe et al. ............. 361/687 |
| 5,959,836 A | * | 9/1999 | Bhatia ......................... 361/687 |
| 5,969,939 A | | 10/1999 | Moss et al. .................. 361/686 |
| 6,084,769 A | * | 7/2000 | Moore et al. ........... 165/104.33 |
| 6,094,347 A | * | 7/2000 | Bhatia .................... 165/104.33 |
| 6,118,654 A | * | 9/2000 | Bhatia .................... 165/104.14 |
| 6,181,553 B1 | * | 1/2001 | Cipolla et al. ......... 165/104.33 |
| 6,276,448 B1 | * | 8/2001 | Maruno .................. 165/104.33 |
| 6,313,987 B1 | * | 11/2001 | O'Connor et al. ........... 361/687 |

* cited by examiner

*Primary Examiner*—Darren Schuberg
*Assistant Examiner*—Anthony Q. Edwards
(74) *Attorney, Agent, or Firm*—Duane Morris LLP

(57) ABSTRACT

The invention is an apparatus for cooling a portable computer while it is attached to a docking station. Heat transfer surfaces on simple thermally conductive plates are attached to heat pipes in both the portable computer and the docking station, and the installation of the portable computer into the docking station is arranged to put the two heat transfer surfaces into thermally conductive contact. With the portable computer heat pipe attached to a heat generating component and the docking station heat pipe attached to a heat sink, heat is transferred to the heat sink through the heat transfer surfaces when they are in contact. The heat sink can be fan cooled, and the fan can be arranged to discharge through either the back or side of the docking station. The heat transfer surface of the portable computer also functions as a cooling surface when the portable computer is detached from the docking station.

4 Claims, 2 Drawing Sheets

PORTABLE COMPUTER AND DOCKING STATION COOLING

BACKGROUND OF THE INVENTION

This invention deals generally with computers and more specifically with the apparatus for cooling a portable computer when it is located within a docking station.

Despite the increased popularity of portable computers such as laptop or notebook computers for the convenience of their portability, there is widespread appreciation that the battery life and heat dissipation of such portables are limiting factors. To accommodate to these limitations, it is typical to use such portable computers in conjunction with a fixed location which is connected to a power line when the computer is at its "home" location. This permits higher power operation without draining the portable's battery and makes cooling devices such as fans available to cool the portable computer. Better cooling of such devices also permits the computer to run at higher speeds which develop more internal heat.

There have been several devices proposed which attempt to interconnect the heat generating components of a portable computer to the heat dissipating devices in a fixed location docking station, but there are significant problems in that effort. Not only must heat conducting elements in both the portable computer and the docking station align, but various other connections for power and information transfer must also be made. Furthermore, the devices available on the portable computer for these several interconnections are limited. Typically heat transfer connections end up with relatively small heat conduction surfaces such as those derived from insertion of a cylindrical or conical pin into a hole, and contact between the surfaces of such connections are not constant and reliable. Furthermore, such insertion type connectors furnish no significant cooling when the portable computer is not mounted in the docking station.

It would be very beneficial to have large surface area thermal connectors on both the portable computer and the docking station, with low thermal resistance devices to transfer heat to and from such connectors, and with some cooling capability of the portable computer's thermal connector when the portable computer is not in the docking station.

SUMMARY OF THE INVENTION

The present invention provides effective cooling of devices within a portable computer both when the portable computer is mounted in a docking station or attached to a power supply or auxiliary battery and when it is not. This is accomplished by using a large surface heat sink near a surface of the portable computer exposed to the external environment which disposes of heat when the portable computer is detached from the docking station, and this same large surface heat sink is used as a thermal connector to the docking station.

Within the portable computer a heat pipe is attached to the heat source, such as a central processing unit, by a thermally conductive connection. This is typically done by using a thermally conductive socket plate which is held tightly against the heat source with spring clips of some sort. A first heat pipe is attached to the thermally conductive socket so that the heat pipe conducts heat away from the heat source to a heat sink. This arrangement is typical of prior art cooling of computer components.

In the present invention, in addition to the aforementioned heat sink, the first heat pipe attached to the socket at the heat source is also attached to a first thermally conductive plate or other large surface structure mounted near a surface of the portable computer, usually the rear surface of the keyboard portion of the portable computer. This first thermally conductive plate has at least one surface that can be exposed to the outside environment by the removal of a covering shield. It is important that the thermally conductive plate is not directly exposed to the environment since its elevated surface temperature creates a personnel safety hazard. Thus, when the portable computer is not mounted in a docking station, the first plate performs as a heat sink through the vented case and shield to dispose of heat from the heat source. The first plate or other surface structure cools by both radiating heat to the environment and by natural convection.

The effectiveness of the first heat pipe, for that matter of any well designed heat pipe, is such that the temperature of the heat source is maintained essentially at the temperature of the first thermally conducting plate. The result is that the very small computer component located within the body of the portable computer and surrounded by other components, many of them also generating heat, actually runs as cool as if it were mounted on the outside of the portable computer case. In fact, because the cooling effect is directly related to the amount of surface area exposed to a cooler environment, and the first thermally conductive plate or other surface structure has a much larger surface area than the typical internal computer component, an internal component cooled by the apparatus of the invention actually runs cooler than it would if it were itself mounted on the outside of the portable computer case.

The task of the portion of the invention located within the docking station is to cool the first thermally conductive plate or other surface structure better than it is cooled by simply exposing it to the temperature of the outside environment, which typically is room temperature. This additional cooling is accomplished by an arrangement which is similar to the heat pipe and the first thermally conductive plate or other large surface structure within the portable computer.

A second thermally conductive plate or surface structure is located on a surface of the docking station, and this second structure matches and contacts the first conductive plate of the portable computer after the shield has been removed. The second matching structure can be on the surface of the docking station since it is not connected to a heat source when it is exposed and does not pose a personnel safety hazard. The second matching structure therefore is placed into intimate thermal contact with the first plate when the portable computer is mounted into the docking station. The plates or other structures, with large conductive surfaces in contact, are excellent for exchanging heat, so the heat from the first plate flows into the second plate. A second heat pipe is attached to the second plate and transfers heat to a heat sink such as an assembly of fins. These fins can be cooled by either natural or forced air convection.

As with the first heat pipe within the portable computer, the second heat pipe within the docking station conducts the heat so effectively that the second plate is maintained at a temperature essentially the same as the air cooled fins. Then, with only a slight temperature difference across the junction of the first plate and the second plate, the first plate and the heat source are maintained at a temperature only very slightly higher than the temperature of the cooling fins. Furthermore since the cooling fins can be forced air cooled by a fan installed in the docking station, the temperature of the heat source can be lowered dramatically from the temperature which would be maintained if the portable computer were separate from the docking station.

The structure of the invention thereby furnishes improved cooling for the portable computer, not only when the portable computer is in the docking station, but also when the portable computer is detached from the docking station.

DETAILED DESCRIPTION OF THE INVENTION

Figure 1:
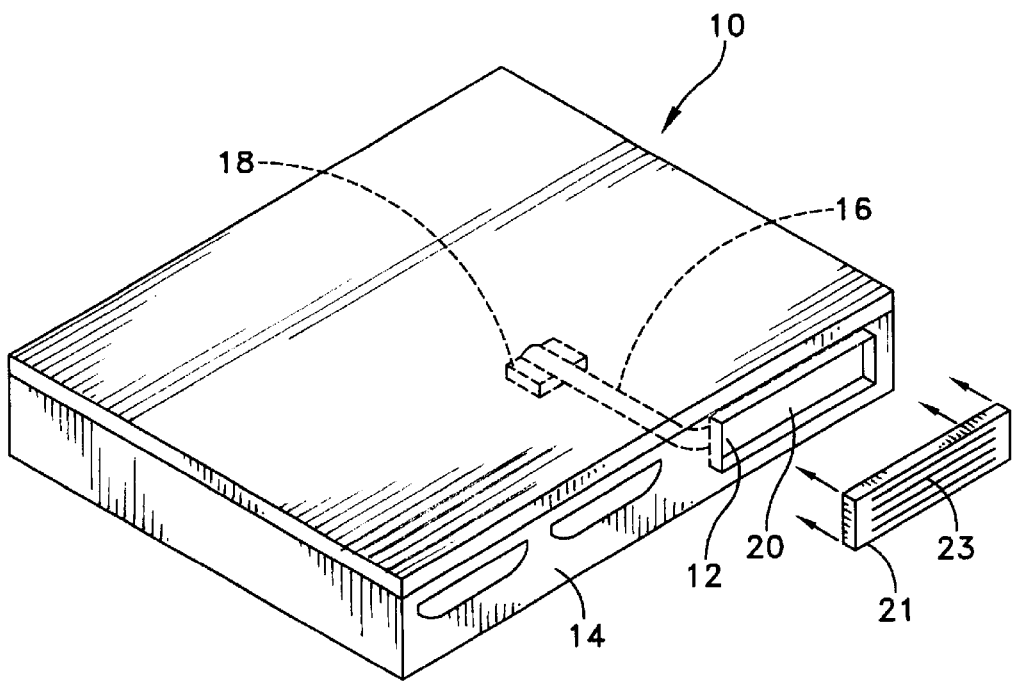
FIG. 1 is a perspective view of a portable computer showing the connection surface at the rear of the portable computer constructed according to the invention.

FIG. 1 is a perspective view of portable computer 10 showing connection surface 20 constructed according to the invention located near rear surface 14 of portable computer 10.

Also shown in FIG. 1, in dashed lines, is first heat pipe 16 which is attached to first thermally conductive plate 12 on which connection surface 20 is located. First heat pipe 16 is also mounted in thermally conductive communication with a heat generating component 18. Such thermally conductive mounting is conventionally attained by attaching first heat pipe 16 to a portion of a heat conductive socket or plate (not shown) which is held in intimate contact with heat generating component 18. First heat pipe 16 is attached to first thermally conductive plate 12 by a thermally conductive bond, typically brazing or soldering, so that a complete low thermal impedance path exists from heat generating component 18 to surface 20 of first heat conductive plate 12.

When portable computer 10 is isolated from a docking station as it is shown in FIG. 1, surface 20 functions as a heat dissipating surface for heat generating component 18. Heat generating component 18 has a very small total surface area, and even if it were not located deep within portable computer 10, it would be running quite hot because its small surface area would be unable to dispose of its heat unless its temperature were considerably higher than the air around it. However, first heat pipe 16 effectively transfers the heat generated by component 18 to first heat conducting plate 12 which has a significantly larger surface area exposed to the surrounding air than heat generating component 18 could have. Essentially, surface 20 improves the cooling of heat generating component 18 by approximately the ratio of their exposed surface areas.

In the preferred embodiment of the invention, the improvement attained by using larger surface 20 is a factor of ten. Thus, first heat conducting plate 12 acts as a cooling surface for heat generating component 18 even when portable computer 10 is not mounted in its docking station.

Surface 20 is actually covered by shield 21 when portable computer 10 is not in the docking station to prevent personnel from contacting surface 20 which is at elevated temperatures. However, louvers 23 or other openings are formed within shield 21, rear surface 14, and/or portable computer 10 to permit air flow across surface 20.

Figure 2:
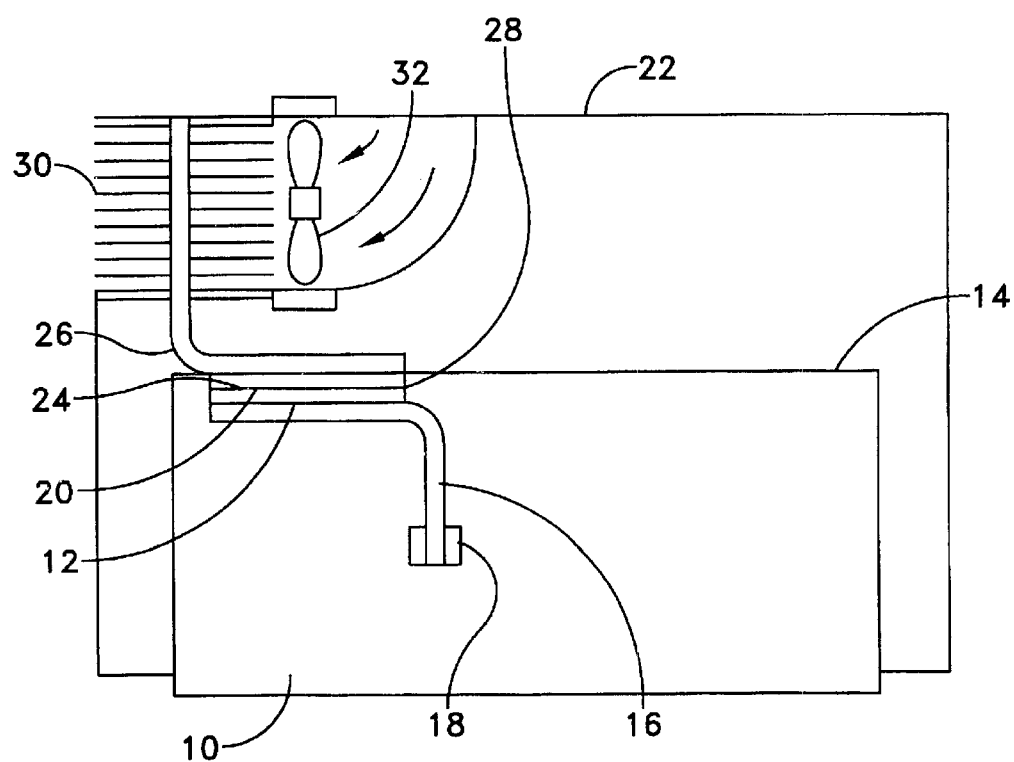
FIG. 2 is a schematic top view of the portable computer of the invention mounted within a docking station with the top covers removed and showing only the components pertinent to the present invention.

FIG. 2 is a schematic representation of the apparatus of the invention when portable computer 10 is mounted within docking station 22. FIG. 2 is essentially a top view of portable computer 10 and docking station 22 attached together with the top covers removed and showing only the components pertinent to the present invention.

When portable computer 10 is mounted in docking station 22 as shown in FIG. 2, surface 20 is held tightly in full contact with mating surface 24 of docking station 22 by the same means (not shown) which conventionally holds together portable computer 10 and docking station 22. This provides full contact between surfaces 20 and 24 and permits heat to transfer between them with a minimum of thermal resistance. This is essentially because the thermal resistance between two surfaces is inversely proportional to the cross section area of the heat transfer path, and the two surfaces 20 and 24 have substantial cross section areas compared to the pin contacts of the prior art. In the preferred embodiment of the invention, surfaces 20 and 24 of are actually 10 mm by 60 mm.

Surface 24 therefore operates as a cooling element for surface 22, which, as noted above, is the means by which heat generating component 18 is cooled. Heat transferred to surface 24 is then removed by second heat pipe 26. Surface 24 is one of the surfaces of second heat conducting plate 28, and heat conducting plate 28 is attached to second heat pipe 26. The attachment is similar to how first heat pipe 16 is attached to first heat conducting plate 12, by conventional methods such as brazing or soldering. These methods provide excellent heat transfer between the plates and the heat pipes. Second heat pipe 26 then transfers the heat from second heat conductive plate 28 to a heat sink for final disposal.

In the preferred embodiment of the invention, the heat sink is cooling fin assembly 30. Cooling fin assembly 30 is constructed of 58 aluminum fins 25.4 mm by 12.7 mm, and since each fin has two surfaces, the total heat transfer surface area available for transfer of heat to the air in the surrounding environment is about 500 square centimeters. With this large surface area available, the temperature difference between the surrounding air and the fins is minimal, but it can be reduced even further by the use of fan 32. In the preferred embodiment, fan 32 is a plastic DC fan 25 mm by 25 mm by 6 mm yielding 1.6 cubic feet per minute of air flow.

By the use of the large contact surface areas of heat conductive plates 12 and 22, when the portable computer is mounted within the docking station the present invention is able to maintain the total temperature difference between the heat generating component and the air outside the docking station to less than 35 degrees centigrade while transferring 33 watts.

Thus, the present invention is able use surface 20 of the portable computer not only as the thermal connection of the portable computer to the docking station, but also as an effective heat disposal surface when the portable computer is not mounted within the docking station.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, the specific location and style of fan 32 may be varied so that the air is taken in on other surfaces of the docking station or is directed at the fins in another manner.

What is claimed as new and for which Letters Patent of the United States are desired to be secured is:

1. An apparatus for cooling a portable computer comprising:
   a first heat pipe, a first portion of which is mounted in thermal communication with a heat generating component in a portable computer; and a first thermally conductive surface attached to a second portion of the first heat pipe and located adjacent to an external surface of the portable computer so that a vertically oriented, substantially planar surface of the first thermally conductive surface acts as a radiant heat transfer device when exposed to the environment outside the portable computer.

2. The apparatus of claim 1 further including:

a docking station into which the portable computer is mounted, with the docking station including:
  a second thermally conductive surface structure having a vertically oriented, substantially planar surface that is located so that the second thermally conductive surface structure is in thermally conductive contact with said vertically oriented, substantially planar surface of the first conductive surface structure when the portable computer is mounted in the docking station;
  a second heat pipe attached to the second thermally conductive surface structure; and
  a heat sink attached to the second heat pipe and exposed to air external to the docking station.

3. The apparatus of claim 2 wherein the heat sink is an assembly of cooling fins attached to the second heat pipe.

4. The apparatus of claim 3 further including a fan mounted within and powered by the docking station, with the fan moving air through the assembly of fins.

* * * * *